(12) United States Patent
Sarkar et al.

(10) Patent No.: US 8,345,083 B2
(45) Date of Patent: Jan. 1, 2013

(54) DYNAMIC MANAGEMENT OF PICTURE QUALITY IN A VIDEO CONFERENCE WITH DIVERSIFIED CONSTRAINTS

(75) Inventors: Shantanu Sarkar, San Jose, CA (US); Arturo A. Rodriguez, Norcross, GA (US)

(73) Assignee: Cisco Technology, Inc., San Jose, CA (US)

( * ) Notice: Subject to any disclaimer, the term of this patent is extended or adjusted under 35 U.S.C. 154(b) by 1523 days.

(21) Appl. No.: 11/831,729

(22) Filed: Jul. 31, 2007

(65) Prior Publication Data

US 2009/0033739 A1 Feb. 5, 2009

(51) Int. Cl.
*H04N 7/14* (2006.01)
(52) U.S. Cl. .................. 348/14.09; 348/14.13
(58) Field of Classification Search .......... 348/14.09, 348/14.13; 370/260–269
See application file for complete search history.

(56) References Cited

U.S. PATENT DOCUMENTS

2005/0007956 A1* 1/2005 Nilsson et al. ............. 370/232
2007/0263087 A1* 11/2007 Hong et al. ............. 348/14.13

OTHER PUBLICATIONS

"Joint Draft 9 of SVC Amendment", Joint Video Team (JVT) of ISO/IEC MPEG & ITU-T VCEG, (ISO/IEC JTC1/SC29/ WG11 and ITU-T SG16 Q.6), 22nd Meeting: Marrakech, Morocco, Jan. 13-19, 2007, Draft ISO/IEC 14496-10 (2006), Document: JVT-V201, 181 pages, Table of Contents, Section 7.4, Section 8, and Annex A.2.
European Examination dated Jul. 9, 2010 in Application No. 08 796 683.4-2223.
International Preliminary Report on Patentability and Written Opinion in International Application No. PCT/US2008/071308 dated Feb. 2, 2010.
Lee et al., "Allocation of Layer Bandwidths and FECs for Video Multicast Over Wired and Wireless Networks", IEEE Transactions on Circuits and Systems for Video Technology, vol. 12, No. 12, Dec. 2002, pp. 1059-1070.

* cited by examiner

*Primary Examiner* — Curtis Kuntz
*Assistant Examiner* — Sunita Joshi
(74) *Attorney, Agent, or Firm* — Merchant & Gould

(57) ABSTRACT

In one embodiment, a method dynamically configures a BL bandwidth in a conference based on bandwidth capabilities in the video conferencing network. In one embodiment, the conference may include any combination of endpoints characterized as BL endpoints and SVCL endpoints. The method includes determining one or more bandwidth capabilities for a plurality of endpoints participating in a conference. The bandwidth capabilities for each respective endpoint may be based on its video decoding capability, the maximum bit-rate it can accept, the video encoding capability of the other endpoints, or a bandwidth constraint manifestation in a portion of the network, etc.

27 Claims, 6 Drawing Sheets

DYNAMIC MANAGEMENT OF PICTURE QUALITY IN A VIDEO CONFERENCE WITH DIVERSIFIED CONSTRAINTS

TECHNICAL FIELD

Particular embodiments generally relate to video conferencing.

BACKGROUND

In a video conference, scalable video coding (SVC) may be used to send compressed video to participating endpoints. SVC includes one or more incremental enhancement layers of compressed video in addition to the compressed video of the base layer (BL). The premise of SVC is that the picture quality rendered at a video conference's endpoint that decodes the BL and at least one SVC layer (SVCL) is higher than at an endpoint that only decodes the BL. The ITU H.264 video coding standard, also known as either MPEG-4 Part 10 or MPEG Advanced Video Coding (AVC), is one of several video specifications provisioned to extend the BL of compressed video with a SVCL. The BL may be considered a common denominator of picture quality, or system default, for the plurality of endpoints in a video conference, and is set at a low bit-rate, such as 128 kilobits per second (kbps), irrespective of whether a higher BL bit-rate can be provided to all the active or participating endpoints during an interval of time. SVC uses a bit-rate in the transmission of the video which is typically lower than the bit-rate of the BL. When SVC's corresponding enhancement layers are decoded at an SVLC endpoint, picture quality is improved via an increase of the decoded picture resolution, picture or frame rate and/or by at least one other improved picture characteristic. A video conference may include SVLC endpoints and BL endpoints. SVLC endpoints are capable of receiving and decoding one or more SVCLs and the BL. BL endpoints are capable of only receiving or decoding the BL. BL endpoints do not decode a SVCL but only decode the BL, while an SVCL endpoint can decode both, the BL and at least one SVLC. Thus, BL endpoints cannot use the enhancement layers and only the BL is used to display pictures. This usually results in a lower quality picture at BL endpoints.

DESCRIPTION OF EXAMPLE EMBODIMENTS

Overview

In one embodiment, a method dynamically configures a BL bandwidth in a conference based on bandwidth capabilities in the video conferencing network. In one embodiment, the conference may include any combination of endpoints characterized as BL endpoints and SVCL endpoints. The method includes determining one or more bandwidth capabilities for a plurality of endpoints participating in a conference. The bandwidth capability for each respective endpoint may be based on one or more constraints, including, but not limited to: its video decoding capability, the maximum bit-rate it can accept, the video encoding capability of the other endpoints, or a bandwidth constraint manifestation in a portion of the network that affects the endpoint. As an example, the endpoint may support 512 kbps but a portion of the network may only support 128 kbps for the particular set of participating endpoints. A bandwidth capability is then determined from the one or more bandwidth capabilities determined for the respective participating endpoints by configuring the BL's bit-rate to 128 kbps.

In yet another example, the configuration of the bit-rate for the BL is determined based on attempting to provide the participating BL and SVCL endpoints with an optimal video experience (i.e., the best picture quality). The BL bandwidth is dynamically configured based on determined bandwidth capabilities and that BL endpoints are not capable of decoding the SVCL, even if it there was sufficient network bandwidth to receive the SVCL. For example, if a conference includes BL and SVCL endpoints and the BL endpoints and the network can support up to 512 kbps, then the base layer bandwidth may be configured to be 512 kbps, which may change a lower preset system default of 128 kbps to 512 kbps. The system default may have been preset to a lower bit-rate for one of several reasons, such as in anticipation of an endpoint having lower bandwidth capability or because a lesser capable endpoint participated in the video conference for a past interval of time. Sending pictures at 512 kbps provides a better picture quality of video received at BL endpoints. SVCL endpoints may still receive enhancement layers that may be used to further enhance the picture quality of the video at their end. This provides a better picture for the BL endpoints by raising the system default for the BL of the SVCL endpoints.

Example Embodiments

Figure 1:
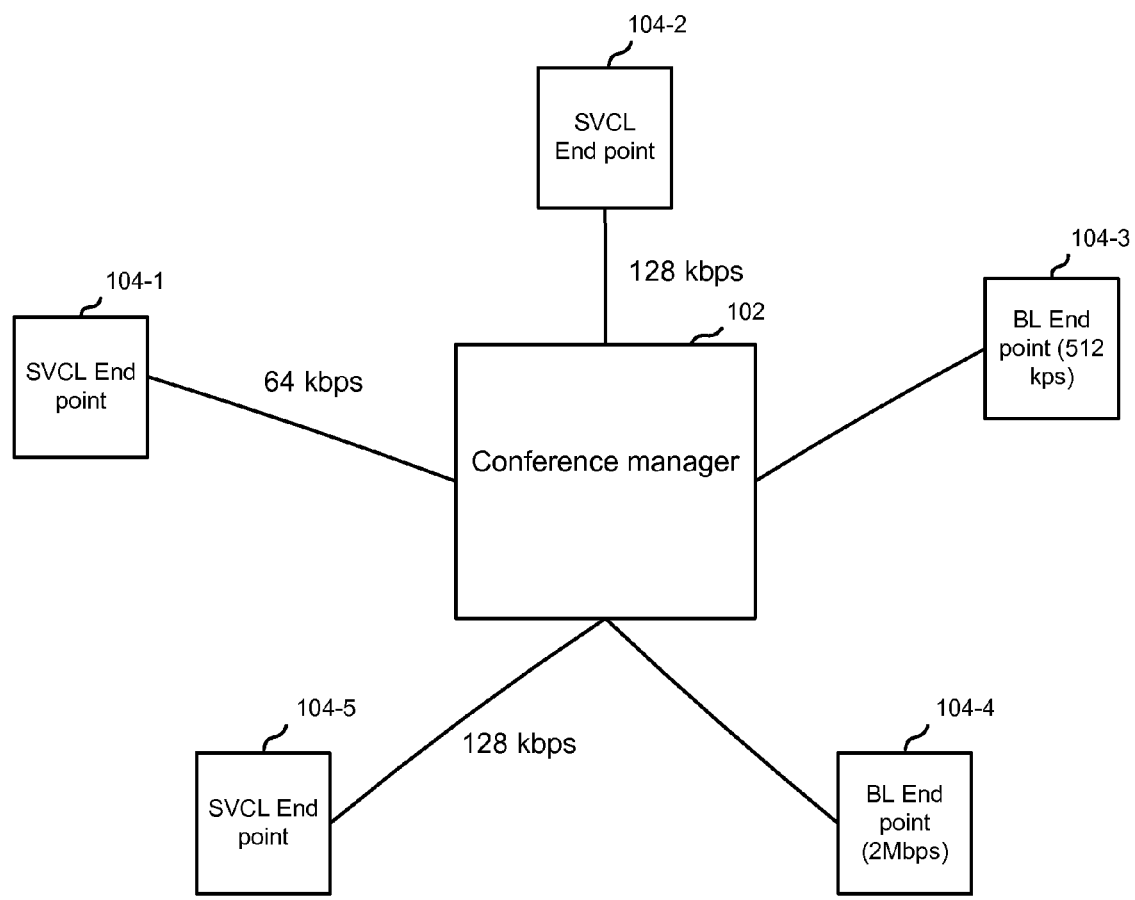
FIG. 1 depicts an example of a system for providing dynamic configuration of a base layer.

FIG. 1 depicts an example of a system for providing dynamic configuration of a base layer. As shown, a conference manager 102 and a plurality of endpoints 104 are provided.

Conference manager 102 is configured to facilitate a conference among endpoints 104. Conference manager 102 may include a multi-point conferencing unit (MCU), bridge, switch, or any other network device that can facilitate a conference. In one embodiment, conference manager 102 mixes incoming audio signals such that a single audio stream is transmitted to all endpoints 104. Further, conference manager 102 combines the incoming video streams into a single video stream of a sequence of composited pictures that show each of the conference participants in a respective portion of a visual presentation of the single video stream. A person skilled in the art will appreciate how conference manager 102 may combine incoming video streams and send video streams in a conference. Also, although this conference system is shown, it will be understood that other systems may be used.

Video may be transmitted as a BL with incremental enhancement layers on top of the BL. Scalable video may be referred to as video that is sent as a BL and incremental enhancement layers. The video may be sent in the form of SVC but other coding specifications may be used. In one embodiment, the BL is sent in a first stream with the enhancement layers sent in different streams in a temporally consistent interspersed manner, such as when the set of streams are multiplexed in a type of transport stream. The BL's bandwidth is encoded at the system default typically. For example, the system default may be a low bit-rate. The low bit-rate ensures that all endpoints 104 in the conference can receive the BL reliably. For example, if some endpoints 104 cannot receive data at a high bit-rate due to network or system constraints or the endpoint itself, then data for BL may not be reliably sent to them. However, using a low BL bit-rate allows most endpoints to be able to receive the base layer reliably. Then, other endpoints that can receive data at higher bit-rates and are SVCL capable can use the SVCLs to enhance the BL picture. The enhancement layers include more information and can be used to provide a picture with better picture quality than just using the base layer.

Endpoints 104 may be any endpoints that can participate in a video conference. Endpoints 104 receive one video stream comprising a sequence of pictures and the associated audio. End points 104 may be classified as BL endpoints 104 and SVCL endpoints 104. In one embodiment, a first type of endpoint 104 may operate as a BL endpoint or a SVLC endpoint. A second type of endpoint 104 can only operate as a BL endpoint. BL endpoints are capable of only receiving or decoding the BL. BL endpoints do not decode a SVCL but only decode the BL, while an SVCL endpoint can decode both, the BL and at least one SVLC. Although the ITU H.264 video coding specification is discussed herein, it will be understood that other video coding specifications may be used with particular embodiments. Also, it will be understood that successive video coding specifications or extensions may also be used with particular embodiments.

BL endpoints 104 can only decode the base layer received from SVCL endpoints 104 or conference manager 102. If the base layer is transmitted at a low bit-rate, then the picture quality at BL endpoints 104 may be low. A video conference may include endpoints capable of receiving and decoding one or more SVCLs and BL endpoints that are capable of only receiving or decoding the BL. BL endpoints do not decode a SVCL but only decode the BL, while an SVCL endpoint can decode both, the BL and at least one SVLC. Thus, BL endpoints cannot use the enhancement layers and only the BL is used to display pictures. In one embodiment, the compressed video is transmitted through the video conferencing network by providing the BL and the one or more incremental enhancement layers interspersed in the same identifiable video stream. In an alternate embodiment, the BL is provided in one identifiable stream and the one or more incremental enhancement layers are provided in separate identifiable streams.

Accordingly, particular embodiments are configured to dynamically configure a base layer bandwidth for the conference. For example, the system default for the base layer in a SVCL conference may be low such that it is guaranteed that all endpoints 104 receive the BL. The enhancement layers may then be used to incrementally display more information in a picture. However, in a mixed conference with endpoints 104 classified as BL endpoints 104 and SVCL endpoints 104, it may not be desirable to have the BL be a low bit-rate. This is because the BL endpoints can only decode the BL and thus the picture quality will be low. Thus, particular embodiments may determine a BL bit-rate that is higher than the system default when BL endpoints 104 are participating in the conference. This allows the BL endpoints 104 to receive a BL that provides a better picture quality. Also, the SVCL endpoints 104 can still use enhancement layers to provide a picture.

An endpoint 104 in a video conference is a device capable of full-duplex bi-directional visual communication, including the capability to receive at least one compressed video stream corresponding to visual information from at least one remote endpoint while simultaneously transmitting a video compressed stream for providing local visual information to one or more endpoints 104. A video stream received by endpoint 104 may be a single video stream of a sequence of composited pictures, each composited picture when displayed conveying visually the respective conference participants in a separate portion of the displayed picture. An endpoint 104 is characterized by its video decoding capability, or by an associated portion of a video conferencing network that constrains the bit-rate (i.e., bandwidth) of the compressed video it can receive during a video conference. An endpoint may exhibit limited video decoding capabilities and characterized as a BL endpoint due to any of the following reasons:
(1) it can ingest compressed video up to a maximum bit-rate;
(2) it does not possess sufficient computing or processing resources to process an enhancement layer;
(3) it is deployed as an endpoint compliant to the syntax and semantics of the BL of a video coding specification but not the those of the SVCL (i.e., it is a second type of endpoint); or
(4) a portion of the network that carries remote visual information to that endpoint has limited bandwidth or throughput capabilities.

Different circumstances may characterize endpoints 104 as BL endpoints or SVCL endpoints. An endpoint may have limited video encoding capability causing it to produce a constrained compressed video stream. For instance, an endpoint 104 may produce and transmit just the BL. In some cases, a first type of endpoint may be a BL endpoint and then be recharacterized as an SVCL endpoint. Network limitations for an endpoint may lead to it being characterized as a BL endpoint (even though it can process enhancement layers). However, if those network conditions improve, then the endpoint may be characterized as an SVCL endpoint (because it may now be able to process enhancement layers).

Herein, determining the bandwidth capability for an endpoint may include characterizing the endpoint according to its video decoding capability, by the maximum bit-rate it can ingest, the bandwidth constraints imposed on the endpoint by an associated portion of the network, and/or on whether it is a first or a second type of endpoint. The video decoding capability may be based on whether or not end point 104 can decode an enhancement layer. The decoding capability of an endpoint 104 may be related to not having sufficient computing resources. The maximum bit-rate it can ingest may be the bit-rate that an end point is configured to process. Also, the bandwidth constraints are whether the base layer and enhancement layers can be received because of bandwidth constraints somewhere in the network.

Different scenarios may result depending on the participants in a conference; however, conference manager 102 is configured to determine a bandwidth for the base layer that may provide the best video experience for the participating endpoints 104 based on determining their bandwidth capabilities and/or their endpoint types. For example, conference manager may analyze factors to determine the base layer bandwidth: the network link with the least bandwidth and the capability (encoding or decoding) of endpoints 104. The base layer may be less than or equal to the lowest value of the above factors. That is, the base layer bandwidth is maximized based on the requirements that it be less than or equal to the lowest bandwidth for a network link or the lowest capability of the least powerful BL endpoint 104.

In specific examples, if a combination of AVC and SVCL endpoints 104 are in a conference, then the bandwidth supported by BL endpoints 104 may be determined. The lowest bandwidth supported by BL endpoints 104 may then be configured as the base layer bandwidth. This bandwidth may be higher than the system default bandwidth for SVCL endpoints 104. Thus, a picture at BL endpoints 104 may be improved because the base layer bandwidth is increased. Other scenarios will be described in more detail below. When these scenarios result, conference manager 102 may dynamically configure the base layer bandwidth to provide an optimal video experience.

Figure 2:
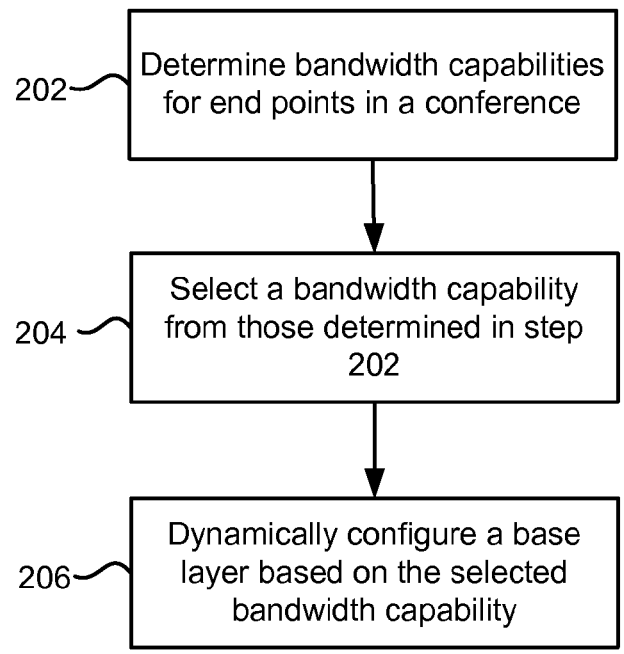
FIG. 2 depicts an example of a method for dynamically configuring a base layer.

FIG. 2 depicts an example of a method for dynamically configuring a base layer. Step 202 determines bandwidth capabilities for endpoints 104 in a conference. The bandwidth capabilities for endpoints 104 may be based on capabilities of endpoints 104, capabilities of networks coupled to endpoints 104, or the types of endpoints participating in the conference. For example, some endpoints 104 may be configured to support a certain bit-rate, such as BL endpoints 104 may be configured to support bit-rates such as 512 kbps or 2 Mbps. Also, endpoints 104 may be communicating across a network, such as a wide area network (WAN) link. A WAN link may only provide certain guarantees of service, such as certain QoS levels. In one example, resource reservation protocol (RSVP) may be used to reserve guarantees in bandwidths to endpoints 104. The guarantee in bandwidth received may be the bandwidth capability for an endpoint 104.

Step 204 then selects a bandwidth capability from those determined in step 202. Different methods for selecting a bandwidth capability may be used, for example, according to criteria based on one or more constraints that characterize an endpoint. The bandwidth selected attempts to provide an optimal video experience for endpoints 104. In one example, in an all-SVCL endpoint conference, different RSVP reservations may be determined for different endpoints. The lowest bandwidth that is guaranteed by RSVP may then be selected as the base layer bandwidth. This ensures that a reliable base layer may be sent to all endpoints 104. Further, in a mixed AVC/SVC conference, the base layer may be selected as the highest bit-rate that all BL endpoint can support.

Step 206 then dynamically configures a base layer based on the selected bandwidth capability. The configuration may be dynamic by sending a signal or message to the respective endpoints 104. In response to the message, an endpoint adjusts bit-rate of the compressed video it provides to the conference, for example, by adjusting the bit-rate of the BL, the bit-rate of one or more SVCLs, or the overall bit-rate. In this case, SVCL endpoints 104 may dynamically adjust the base layer bit-rate they emit. The base layer bit-rate may be adjusted when a new sequence of pictures starts, such as at an IDR picture in ITU H.264 compressed video. Upon an adjustment of BL bit-rate, SVCL endpoints 104 may not notice a change in picture quality in the received video stream since the overall bit-rate (i.e., BL and SVCL combined bit-rate) may be relatively the same as prior to the adjustment.

It should be noted that endpoints 104 may join and drop out of the conference. The base layer may start at the system default. When changes are needed, conference manager 102 may dynamically configure the base layer bandwidth. The dynamic configuration of the base layer may be reconfigured when bandwidth capabilities change. For example, if a higher base layer bandwidth can be allowed because a BL endpoint 104 drops out, then, the base layer bandwidth can be increased. Also, if all BL endpoints 104 drop out, the base layer may be lowered because the restrictions with having BL endpoints 104 in the conference would be removed. SVCL endpoints 104 would be able to decode the base layer and the enhancement layers.

Difference scenarios in the conference may result and particular embodiments may handle the scenarios differently. In a first scenario, all endpoints 104 are SVCL endpoints that communicate on a local area network (LAN). The LAN does not have bandwidth restrictions and thus the base layer can be the system default.

Figure 3:
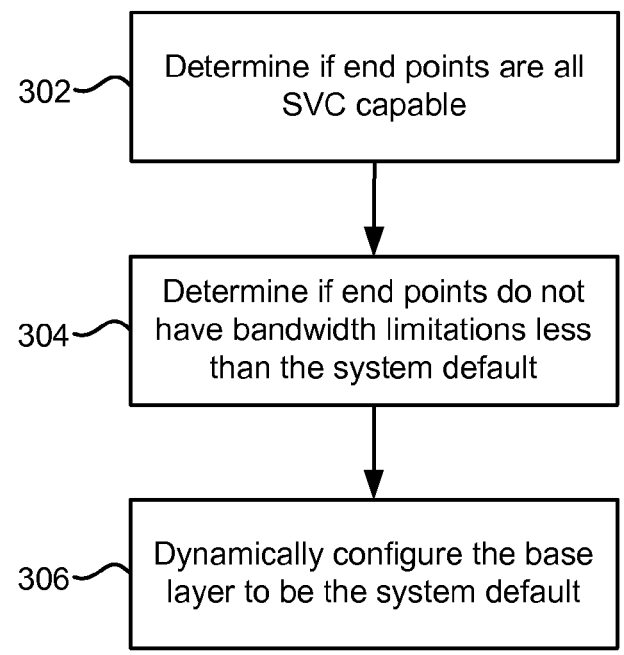
FIG. 3 depicts an example of a method for dynamically configuring the base layer when a conference includes all SVCL endpoints communicate without bandwidth limitations.

FIG. 3 depicts an example of a method for dynamically configuring the base layer when a conference includes all SVCL endpoints 104 communicate without imposing limitations on the default BL bit-rate. Step 302 determines if endpoints 104 are all SVCL capable (i.e., second type of endpoints).

Step 304 determines if endpoints 104 do not have limitations that are less than the system default for the BL bit-rate. In this case, because endpoints 104 are communicating on a LAN, it is expected that the bandwidth capability is higher than the system default.

Step 306 then dynamically configures the base layer to be the system default. In this case, no action may be needed in the conference because the conference is already set at the system default.

A second scenario is when some endpoints 104 are communicating across a WAN link. In this case, the base layer bandwidth should be protected by a bandwidth guarantee. For example, RSVP reservations may be obtained for endpoints 104. Although RSVP is described, it will be understood that other methods of determining bandwidth service levels will be appreciated. The base layer may then be dynamically configured based on the RSVP reservations obtained.

Figure 4:
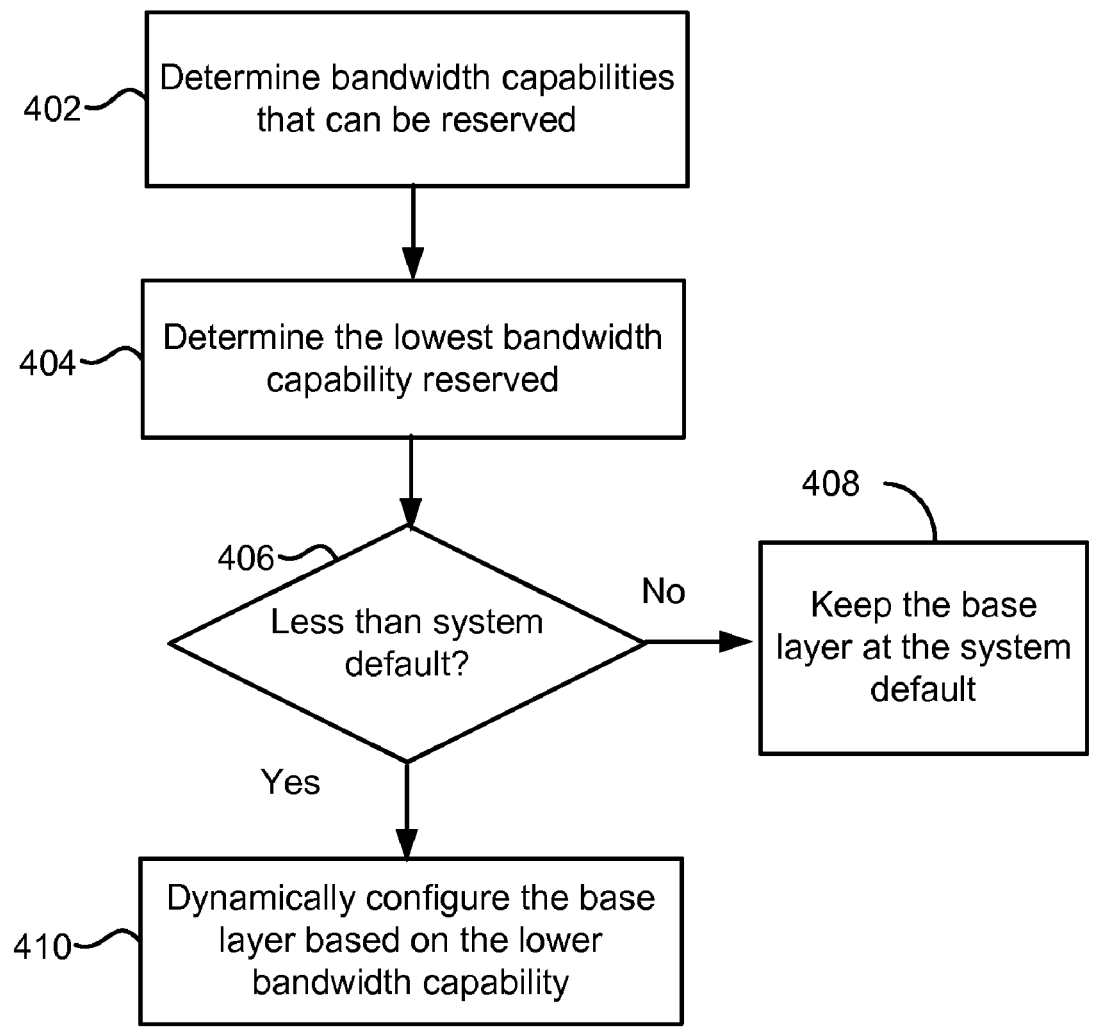
FIG. 4 depicts an example of a method for dynamically configuring the base layer when endpoints communicate across a WAN.

FIG. 4 depicts an example of a method for dynamically configuring the base layer when endpoints 104 communicate across a WAN. Step 402 determines bandwidth capabilities that can be reserved. For example, endpoints 104 may signal what bandwidth reservations they reserved to conference manager 102.

Step 404 determines the lowest bandwidth capability reserved. For example, the system default may be 128 kbps for the base layer. In the conference, endpoints 104-1 and 104-2 may attempt to reserve 128 kbps. However, endpoint 104-1 may only be able to reserve 64 kbps.

Step 406 determines if the lowest bandwidth capability reserved is less than the system default. For example, if the lowest bandwidth capability is lower than the system default, then dynamic reconfiguration may be needed. This is because SVC is sensitive to packet losses in the base layer; however, losses in the enhancement layers may be handled. Thus, it is desirable to have guarantees that the base layer may be sent without packet losses.

If the lowest bandwidth capability is not lower than the system default, then step 408 keeps the base layer at the system default.

If the lowest capability bandwidth reserved is lower than the system default, then step 410 dynamically configures the base layer based on the lower bandwidth capability. For example, the base layer may be set to 64 kbps. This ensures that packet loses at the base layer may be minimized because the RSVP reservation assumes a 64 kbps bit-rate.

In one embodiment, the conference may start at the system default. However, when endpoint 104-1 joins the conference and indicates it can only reserve 64 kbps, then the conference is dynamically reconfigured to make the system default for the base layer 64 kbps. This dynamic reconfiguration may occur throughout the conference as bandwidth capabilities change.

Figure 5:
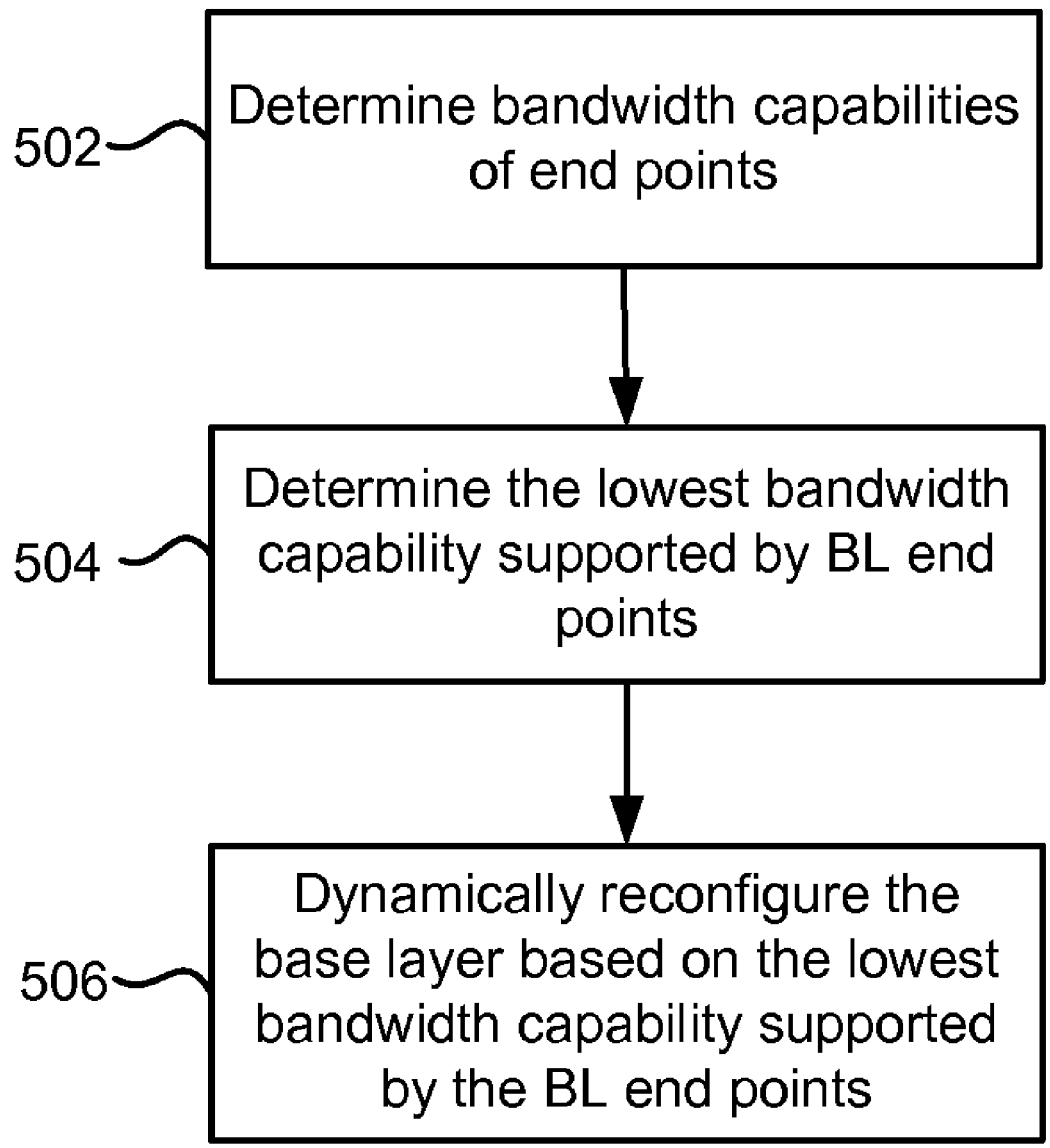
FIG. 5 depicts an example of a conference including the combination of AVC points and SVCL endpoints.

A third scenario is when there is a combination of BL endpoints 104 and SVCL endpoints 104. FIG. 5 depicts an example of a conference including the combination of BL endpoints 104 and SVCL endpoints 104. This method assumes that endpoints 104 are in a LAN only conference. Thus, endpoints 104 are not communicating across a WAN. This situation will be described later.

Step 502 determines bandwidth capabilities of endpoints 104. For example, the bit-rate that is supported by BL endpoints 104 is determined. This is a LAN conference and thus it is assumed that there are no restrictions on bandwidth that are lower than the base layer.

Step 504 determines the lowest bandwidth capability supported by BL endpoints 104. For example, a first BL endpoint 104-3 may be able to support 512 kbps and a second BL endpoint 104-4 may be able to support up to 2 Mbps.

In the beginning, the conference may be set at a system default for the base layer that is 128 kbps. However, when endpoint 104-3 joins the conference, step 506 dynamically reconfigures the base layer based on the lowest bandwidth capability supported by the BL endpoints 104. That is, the system default is reconfigured from 128 kbps to 512 kbps. When endpoint 104-4 joins, this has no effect on the base layer as endpoint 104-4 can support up to 2 Mbps.

Figure 6:
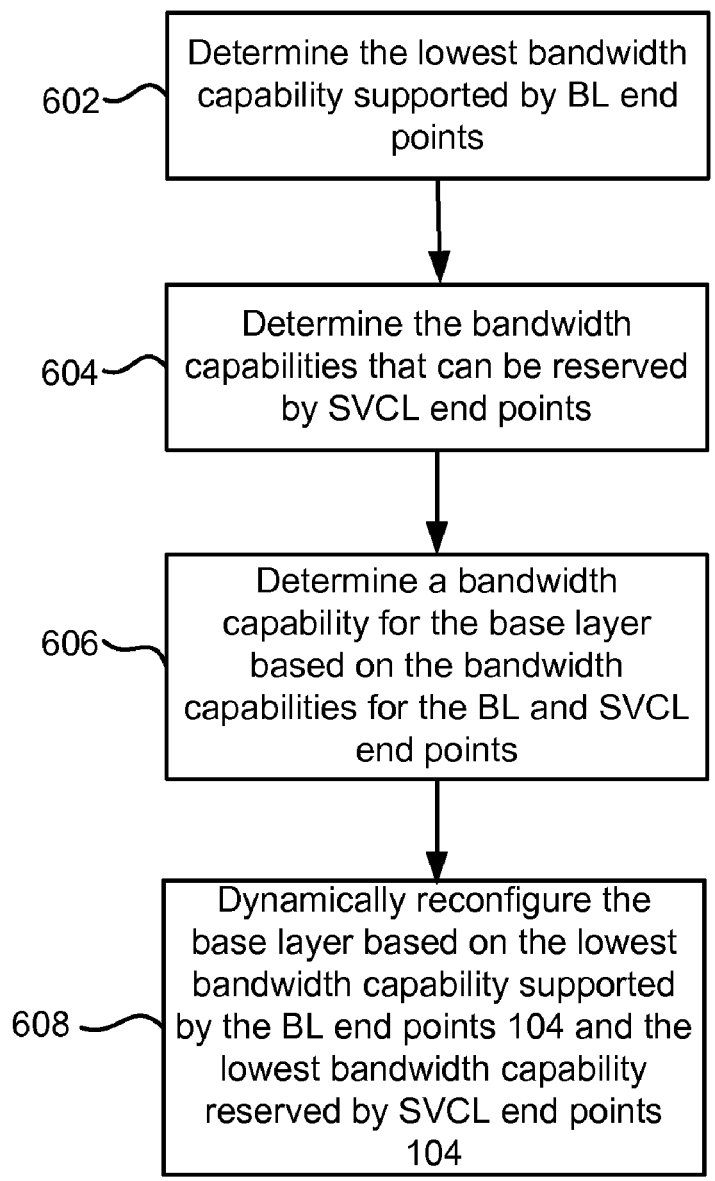
FIG. 6 depicts an example for dynamically configuring the base layer when there is a combination of BL and SVCL endpoints communicating over a WAN.

A fourth scenario results when there is a combination of AVC and SVCL endpoints but they are communicating over a WAN. FIG. 6 depicts an example for dynamically configuring the base layer when there is a combination of AVC and SVCL endpoints communicating over a WAN. Step 602 determines the lowest bandwidth capability supported by BL endpoints 104. This is similar to the determination described in FIG. 5.

Step 604 then determines the bandwidth capabilities that can be reserved by SVCL endpoints 104. As discussed above, endpoints 104 may attempt to reserve bandwidth guarantees using RSVP reservations. In this case, endpoints 104 may attempt to reserve the lowest bandwidth capability that is supported by BL endpoints 104. This ensures that a higher base layer bandwidth can be supported by SVCL endpoints 104. In one example, conference manger 102 may signal to SVCL endpoints 104 what bandwidth they should try and reserve.

Step 606 then determines a bandwidth capability for the base layer based on the bandwidth capabilities for the AVC and SVCL endpoints 104. For example, the bandwidth capability for BL endpoints 104 may provide a lower bound and the bandwidth capability for the SVCL endpoints 104 may provide an upper bound. This is because the lowest bandwidth capability for BL endpoints should be the lowest possible level for the base layer. However, if a base layer bandwidth is selected that is higher than the lowest bandwidth capability of the BL endpoints 104, the video quality is not degraded (but might be better). However, the base layer bandwidth should not be higher than the lowest bandwidth capability reserved by SVCL endpoints 104. This is because higher base layer bandwidth might cause packet loss at the base layer if the bandwidth capability reserved is lower. This may seriously degrade the video quality at SVCL endpoints 104.

Thus, an acceptable bandwidth within the range of the lowest bandwidth capability for BL endpoints 104 and the lowest bandwidth capability for SVCL endpoints 104 may be determined. Step 608 dynamically reconfigures the base layer based on the lowest bandwidth capability supported by the BL endpoints 104 and the lowest bandwidth capability reserved by SVCL endpoints 104. If a lower bandwidth is used because the bandwidth capability reserved is low, then it may be possible to try to increase the RSVP reservations for bandwidth for the WAN bottleneck periodically. Thus, the video quality may be improved for BL endpoints 104 if the base layer can be improved.

Figure 7:
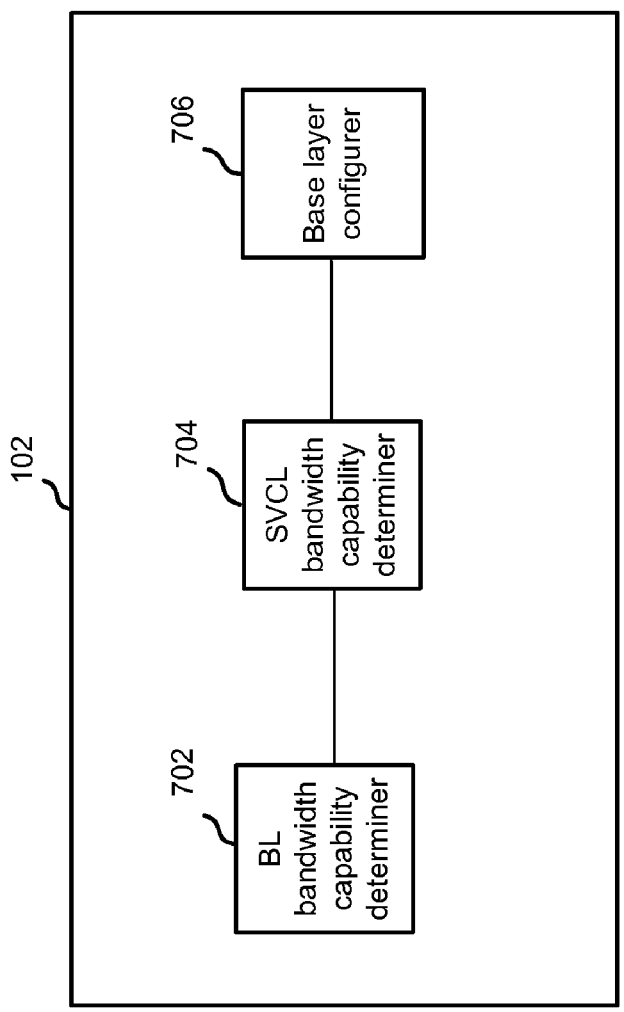
FIG. 7 depicts a more detailed embodiment of a conference manager.

FIG. 7 depicts a more detailed embodiment of conference manager 102. As shown, an AVC bandwidth capability determiner 702, a SVC bandwidth capability determiner 704, and a base layer configurer 706 are provided.

AVC bandwidth capability determiner 702 is configured to determine the bandwidth capabilities for BL endpoints 104. In one embodiment, signaling between endpoints 104 and AVC bandwidth capability determiner 702 is used to determine the bandwidth capability when BL endpoints 104 join a conference.

SVC bandwidth capability determiner 704 is configured to determine the bandwidth capabilities for BL endpoints 104. In one embodiment, SVC bandwidth capability determiner 704 may use the system default or may receive signaling from endpoints 104 indicating what bandwidth capability was reserved.

Base layer configurer 706 then configures the base layer bandwidth based on the bandwidth capabilities determined.

As a result of when BL endpoints 104 joins a conference, conference manager 102 may need to change the profile field in a stream for the conference from a first to a second profile, such as when the first profile corresponds to SVCL support in a video coding specification and the second profile corresponds to BL support (and SVCL also). In some cases, the NAL_unit_type specification (NAL=network abstraction layer) of the picture is also reassigned to a NAL_unit_type that is consistent with the BL and/or the profile. The SVCLs are discarded in concert with reassigning the specification of the picture via NAL_unit_type and changing the profile. In an alternate embodiment, a stream type that identifies the BL is changed from a first to a second stream type value so that the BL can be identified as one corresponding to a first profile of a video coding specification that excludes SVCL.

In one embodiment, endpoints without SVCL capability can receive some form of scalable video that is not SVC but imposed on the base layer. For example, disposable pictures may be included in the base layer. If a BL endpoint 104 can handle more information or a higher bit-rate, then the disposable pictures may be included in the video stream. However, if endpoints 104 cannot handle the extra discardable pictures, they may be dropped. The disposable pictures may be non-reference pictures. The indication of a disposable picture may be by a field designated to a picture coding type that provides the information of whether a picture is disposable from the inferred definition of the picture type. For example, pictures that are dependent on by other pictures, reference pictures, may not be disposable. Also, in another embodiment, a data field may explicitly convey that a picture is disposable.

Particular embodiments provide many advantages. For example, better video quality may be provided to BL endpoints in a mixed SVCL and BL conference. Also, the better video quality may allow for the deployment of SVCL endpoints 104 because mixed BL and SVCL conferences may provide good quality video.

Also, the dynamic configuration may allow the video encoding to be adapted as endpoints join or leave the conference. This dynamic reconfiguration has no effect on the SVCL endpoints 104. Also, the base layer is adapted such that the base layer for SVCL endpoints includes the maximum error resilience when communicating across a WAN. Thus, the base layer is always protected by the dynamic reconfiguration.

Although the description has been described with respect to particular embodiments thereof, these particular embodiments are merely illustrative, and not restrictive. Although SVC is discussed as part of a video coding specification such as ITU H.264, it will be understood that other video coding specifications that use scalable encoding or another form of SVC may be used. Also, although ITU H.264 is discussed, it will be understood that other video coding specifications that do not use SVC may be used.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory.

Particular embodiments can be implemented in the form of control logic in software or hardware or a combination of both. The control logic, when executed by one or more processors, may be operable to perform that what is described in particular embodiments.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method comprising:
    determining one or more bandwidth capabilities for a plurality of endpoints participating in a conference, the plurality of endpoints including a first type of endpoint classified as a scalable video coding layer (SVCL) endpoint and a second type of endpoint classified as a base layer (BL) endpoint;
    determining a base layer bit-rate based on a bandwidth capability of the second type of endpoint;
    configuring the determined base layer bit-rate for scalable video for the plurality of endpoints in the conference; and
    changing a profile for the conference from SVCL endpoint support to BL endpoint support when the second type of endpoint classified as a base layer endpoint joins the conference.

2. The method of claim 1, wherein the first type of endpoint comprises a first video processing capability of processing a base layer of scalable video in addition to one or more enhancement layers.

3. The method of claim 2, wherein the second type of endpoint comprises a second video processing capability of processing only a base layer of scalable video.

4. The method of claim 2, wherein the second type of endpoint comprises a second video processing capability of processing a base layer of scalable video but not one or more enhancement layers for the base layer.

5. The method of claim 1, wherein determining the base layer bit-rate comprises using a network bandwidth available to the second type of end point to determine the base layer bit-rate.

6. The method of claim 5, wherein configuring the base layer bit-rate comprises using the bandwidth capability for the second type of end point rather than a base layer bandwidth for the first type of end point.

7. The method of claim 1, wherein a lowest video processing capability for the second type of endpoint is used as a maximum bandwidth possible for configuring the base layer bit-rate.

8. The method of claim 1, wherein the first type of endpoint and the second type of endpoint are determined based on one of an endpoints video decoding capability, the maximum bit-rate it can accept, the video encoding capability of the other endpoints, and a bandwidth constraint manifestation in a portion of a network.

9. The method of claim 1, wherein the one or more bandwidth capabilities comprise reservations on bandwidth reservations, wherein the determined bandwidth capability is a lowest of the bandwidth reservations.

10. The method of claim 1, further comprising: determining a change in bandwidth capability for the conference; and dynamically re-configuring the base layer bit-rate based on the change in bandwidth capability for the conference.

11. The method of claim 1, wherein the wherein the conference is configured with a default base layer bit-rate for the first type of endpoint, wherein configuring the base layer bit-rate comprises using a bandwidth capability for the second type of endpoint to determine the base layer bit-rate in which to replace the default base layer bit-rate.

12. The method of claim 9, wherein the default base layer bit-rate is less than the base layer bit-rate that is configured.

13. The method of claim 1, further comprising marking a video stream as a base layer stream and one or more enhancement layer streams as enhancement layer streams such that the second type of endpoint can identify the base layer stream.

14. A system for providing dynamic configuration of a base layer comprising:
    one or more processors; and logic encoded in one or more tangible media for execution by the one or more processors and when executed operable to:
    determine one or more bandwidth capabilities for a plurality of endpoints participating in a conference, the plurality of endpoints including a first type of endpoint classified as a scalable video coding layer (SVCL) endpoint and a second type of endpoint classified as a base layer (BL) endpoint;
    determine a base layer bit-rate based on a bandwidth capability of the second type of endpoint;
    configure the determined base layer bit-rate for scalable video for the plurality of endpoints in the conference; and
    change a profile for the conference from SVCL endpoint support to BL endpoint support when the second type of endpoint classified as a base layer endpoint joins the conference.

15. The apparatus of claim 14, wherein the first type of endpoint comprises a first video processing capability of processing a base layer of scalable video in addition to one or more enhancement layers.

16. The apparatus of claim 15, wherein the second type of endpoint comprises a second video processing capability of processing only a base layer of scalable video.

17. The apparatus of claim 15, wherein the second type of endpoint comprises a second video processing capability of processing a base layer of scalable video but not one or more enhancement layers for the base layer.

18. The apparatus of claim 14, wherein the logic operable to determine the base layer bit-rate comprises logic when executed that is operable to use a network bandwidth available to the second type of end point to determine the base layer bit-rate.

19. The apparatus of claim 14, wherein logic operable to configure the base layer bit-rate comprises logic when executed that is operable to use the bandwidth capability for the second type of end point rather than a base layer bit-rate for the first type of end point.

20. The apparatus of claim 14, wherein a lowest video processing capability for the second type of endpoint is used as a maximum bandwidth possible for configuring the base layer bit-rate.

21. The apparatus of claim 14, wherein the first type of endpoint and the second type of endpoint are determined based on one of an endpoints video decoding capability, the maximum bit-rate it can accept, the video encoding capability of the other endpoints, and a bandwidth constraint manifestation in a portion of a network.

22. The apparatus of claim 14, wherein the one or more bandwidth capabilities comprise reservations on bandwidth reservations, wherein the determined bandwidth capability is a lowest of the bandwidth reservations.

23. The apparatus of claim 14, wherein the logic when executed is further operable to:
    determine a change in bandwidth capability for the conference; and dynamically re-configure the base layer bit-rate based on the change in bandwidth capability for the conference.

24. The apparatus of claim 14, wherein the wherein the conference is configured with a default base layer bit-rate for the first type of endpoint, wherein the logic operable to configure the base layer bit-rate comprises logic when executed that is operable to use a bandwidth capability for the second type of endpoint to determine the base layer bit-rate in which to replace the default base layer bandwidth.

25. The apparatus of claim 14, wherein the default base layer bit-rate is less than the base layer bit-rate that is configured.

26. The apparatus of claim 14, wherein the logic when executed further comprises logic configured to mark a video stream as a base layer stream and one or more enhancement layer streams as enhancement layer streams such that the second type of endpoint can identify the base layer stream.

27. A system for providing dynamic configuration of a base layer comprising:

means for determining one or more bandwidth capabilities for a plurality of endpoints participating in a conference, the plurality of endpoints including a first type of endpoint classified as a scalable video coding layer (SVCL) endpoint and a second type of endpoint classified as a base layer (BL) endpoint;

means for determining a base layer bit-rate based on a bandwidth capability of the second type of endpoint;

means for configuring the determined base layer bit-rate for scalable video for the plurality of endpoints in the conference; and means for changing a profile for the conference from SVCL endpoint support to BL endpoint support when the second type of endpoint classified as a base layer endpoint joins the conference.

\* \* \* \* \*